(12) United States Patent
Bem

(10) Patent No.: US 8,135,619 B2
(45) Date of Patent: Mar. 13, 2012

(54) INCREASING A NUMBER OF RELEVANT ADVERTISEMENTS USING A RELAXED MATCH

(75) Inventor: Jeremy Bem, Berkeley, CA (US)

(73) Assignee: Google, Inc., Mountain View, CA (US)

( * ) Notice: Subject to any disclaimer, the term of this patent is extended or adjusted under 35 U.S.C. 154(b) by 0 days.

(21) Appl. No.: 12/627,390

(22) Filed: Nov. 30, 2009

(65) Prior Publication Data
US 2010/0076840 A1    Mar. 25, 2010

Related U.S. Application Data

(63) Continuation of application No. 10/674,888, filed on Sep. 30, 2003, now Pat. No. 7,647,242.

(51) Int. Cl.
*G06Q 30/00* (2006.01)

(52) U.S. Cl. ............... 705/14.52; 705/14.43; 705/14.49; 705/14.55; 705/14.73

(58) Field of Classification Search ............... 705/14.43, 705/14.49, 14.52, 14.55, 14.73, 14 T
See application file for complete search history.

(56) References Cited

U.S. PATENT DOCUMENTS

| | | | |
|---|---|---|---|
| 6,453,315 B1 * | 9/2002 | Weissman et al. | 707/5 |
| 6,907,566 B1 * | 6/2005 | McElfresh et al. | 715/210 |
| 7,076,443 B1 * | 7/2006 | Emens et al. | 705/14.55 |
| 2002/0059094 A1 * | 5/2002 | Hosea et al. | 705/10 |
| 2003/0078928 A1 * | 4/2003 | Dorosario et al. | 707/10 |
| 2003/0182274 A1 * | 9/2003 | Oh | 707/3 |

* cited by examiner

*Primary Examiner* — Eric W Stamber
*Assistant Examiner* — Tri V Nguyen
(74) *Attorney, Agent, or Firm* — John C. Pokotylo; Straub & Pokotylo

(57) ABSTRACT

The number of ads potentially relevant to search query information may be increased by relaxing the notion of search query keyword matching. This may be done, for example, by expanding a set of ad request keywords to include both query keywords (or derivatives of a root thereof) and related keywords. The related keywords may be words with a relatively high co-occurrence with a query keyword in a group of previous search queries (e.g., search queries in a session). The scores of ads with keyword targeting criteria that matched words related to words in a search query, but not the words from the search query, may be discounted. That is, the scores of ads served pursuant to a relaxed notion of matching may be discounted relative to the scores of ads served pursuant to a stricter notion of matching. This may be done by using a score modification parameter, such as an ad performance multiplier (for cases in which an ad score is a function of ad performance information). The score modification parameter may be updated to reflect observed performance data, such as performance data associated with {word-to-related word} mappings.

20 Claims, 12 Drawing Sheets

426'

| ID (WORD 1) | {ID (FIRST RELATED WORD, WEIGHT)}, ... ,{ID LAST OR Nth RELATED WORD, WEIGHT} |
|---|---|
| ⋮ | ⋮ |
| ID (WORD T) | {ID (FIRST RELATED WORD, WEIGHT)}, ... ,{ID LAST OR Nth RELATED WORD, WEIGHT} |

| AD GROUP 1 | FIRST ASSOCIATED AD ID, ... LAST ASSOCIATED AD ID |
|---|---|
| . . . | . . . |
| AD GROUP S | FIRST ASSOCIATED AD ID, ... LAST ASSOCIATED AD ID |

| AD ID | AD INFORMATION | ... | MATCH TYPE | ... | SCORE ADJUSTMENT PARAMETER |
|---|---|---|---|---|---|
| . . . | . . . | . . . | . . . | . . . | . . . |

1020  1030  1040  1050

INCREASING A NUMBER OF RELEVANT ADVERTISEMENTS USING A RELAXED MATCH

§0. RELATED APPLICATIONS

This application is a continuation of U.S. patent application Ser. No. 10/674,888 (referred to as "the '888 application" and incorporated herein by reference), titled "INCREASING A NUMBER OF RELEVANT ADVERTISEMENTS USING A RELAXED MATCH," filed on Sep. 30, 2003 now U.S. Pat. No. 7,647,242 and listing Jeremy BEM as the inventor.

§1. BACKGROUND OF THE INVENTION

§1.1 Field of the Invention

The present invention concerns finding items, such as advertisements ("ads"), relevant to a request, such as a search query. In particular, the present invention concerns helping to determine, score, and/or render an expanded set of relevant ads.

§1.2 Related Art

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Websites" in the specification without loss of generality) as conduits to reach a large audience. Using this first approach, an advertiser may place ads on the home page of the New York Times Website, or the USA Today Website, for example. In another strategy, an advertiser may attempt to target its ads to narrower niche audiences, thereby increasing the likelihood of a positive response by the audience. For example, an agency promoting tourism in the Costa Rican rainforest might place ads on the ecotourism-travel subdirectory of the Yahoo Website. An advertiser will normally determine such targeting manually.

Normally, when a member of the advertising audience (referred to as a "viewer" or "user" in the Specification without loss of generality) selects an ad by clicking on it, embedded hypertext links typically direct the viewer to the advertiser's Website. This process, wherein the viewer selects an ad, is commonly referred to as a "click-through" ("Click-through" is intended to cover any user selection). The ratio of the number of click-throughs to the number of impressions of the ad (i.e., the number of times an ad is displayed or otherwise rendered) is commonly referred to as the "click-through rate" or "CTR" of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed or otherwise rendered) is commonly referred to as the conversion rate. If a conversion is defined to be able to occur within a predetermined time since the serving of an ad, one possible definition of the conversion rate might only consider ads that have been served more than the predetermined time in the past.

The hosts of Websites on which the ads are presented (referred to as "Website hosts" or "ad consumers") have the challenge of maximizing ad revenue without impairing their users' experience. Some Website hosts have chosen to place advertising revenues over the interests of users. One such Website is "Overture.com," which hosts a so-called "search engine" service returning advertisements masquerading as "search results" in response to user queries. The Overture.com Website permits advertisers to pay to position an ad for their Website (or a target Website) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

Search engines, such as Google for example, have enabled advertisers to target their ads so that they will be rendered in conjunction with a search results page responsive to a query that is relevant, presumably, to the ad. Although search result pages afford advertisers a great opportunity to target their ads to a more receptive audience, search result pages are merely a fraction of page views of the World Wide Web. To increase advertising opportunities, some online advertising systems may use ad relevance information and document content relevance information (e.g., concepts or topics, feature vectors, etc.) to "match" ads to (and/or to score ads with respect to) a document including content, such as a Web page for example. The foregoing ad serving systems can be thought of as keyword-targeted systems (where ads are targeted using terms found in a search query) and content-targeted systems (where ads are targeted using content of a document).

The Google ad system allows advertisers to target their ads in a one or more ways so that the ads will likely be relevant, and therefore useful, when served. For example, currently, advertisers may target ads using one of three keyword matching methods: exact; phrase; and broad. With exact matching, the query must be identical to keyword targeting criteria (i.e., one or more words or phrases used to make a targeting judgment (e.g., to determine whether an ad is relevant or not)). With phrase matching, the query must contain the targeting criteria words in the order specified by the phrase. Finally, with broad matching, the query must contain any one of one or more of the targeting criteria keywords, in any order.

All three of these keyword matching methods use keyword targeting criteria. Keyword targeting criteria are normally provided by the advertiser as an explicitly entered list or lists. For example, an advertiser may enter a list of all words which might appear in a relevant search query. Although this approach permits the serving of highly relevant ads, and therefore ads which should perform well, it does have some limits. For example, advertisers might not be able to appreciate, or even foresee, search queries or search terms entered by a user who would be receptive to their ads. Therefore, it would be useful to provide more sophisticated ways of identifying ads that are relevant to a search query, even if the search query doesn't contain the exact words targeted by the advertiser. Therefore it might often be useful to relax the notion of relevant ads.

§2. SUMMARY OF THE INVENTION

The present invention allows the number of ads potentially relevant to search query information to be increased. The present invention may do so by relaxing the notion of search query keyword matching. This may be done, for example, by expanding a set of ad request keywords to include both query keywords (or derivatives of a root thereof) and related keywords. In one embodiment of the invention, the related keywords are words with a relatively high co-occurrence with a query keyword in a group of previous search queries (e.g., search queries in a session).

In one embodiment of the invention, if the related keyword appears in the ad creative, it may be emphasized (e.g., depicted with bold typeface text).

The present invention may also discount the scores of ads with keyword targeting criteria that matched words related to words in a search query, but not the words from the search query. That is, the present invention may discount the scores of ads served pursuant to a relaxed notion of matching relative to the scores of ads served pursuant to a stricter notion of matching. In one embodiment of the present invention, this is done by using a score modification parameter, such as an ad performance multiplier (for cases in which an ad score is a function of ad performance information). The score modification parameter may be updated to reflect observed performance data, such as performance data associated with {word-to-related word} mappings.

§3. BRIEF DESCRIPTION OF THE DRAWINGS

FIG. 9 illustrates an exemplary data structure that is consistent with the present invention, for storing ad information that may be used in the system of FIG. 3.

FIG. 10 illustrates an exemplary data structure that is consistent with the present invention, for storing ad information that may be used in any of the systems of FIGS. 4, 5, and 6.

§4. DETAILED DESCRIPTION

The present invention may involve novel methods, apparatus, message formats, and/or data structures for determining, scoring, and/or rendering an expanded set of relevant ads in an ad system. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as any patentable subject matter described.

In the following, environments in which, or with which, the present invention may operate are described in §4.1. Then, exemplary embodiments of the present invention are described in §4.2. Thereafter, a specific example illustrating the usefulness of one embodiment of the present invention is provided in §4.3. Finally, some conclusions regarding the present invention are set forth in §4.4.

§4.1 Environments in which, or with which, the Present Invention May Operate

§4.1.1 Exemplary Advertising Environment

Figure 1:
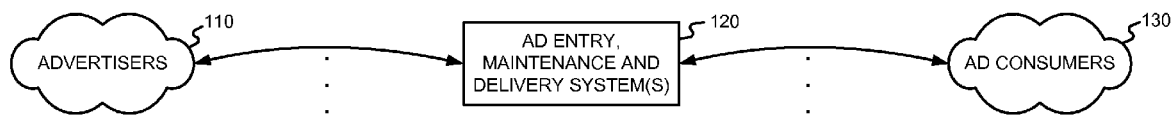
FIG. 1 is a high-level diagram showing parties or entities that can interact with an advertising system.

FIG. 1 is a high level diagram of an advertising environment. The environment may include an ad entry, maintenance and delivery system (simply referred to as an ad server) 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or clickthrough related to the ad occurred) to the system 120. This usage information may include measured or observed user behavior related to ads that have been served.

Figure 2:
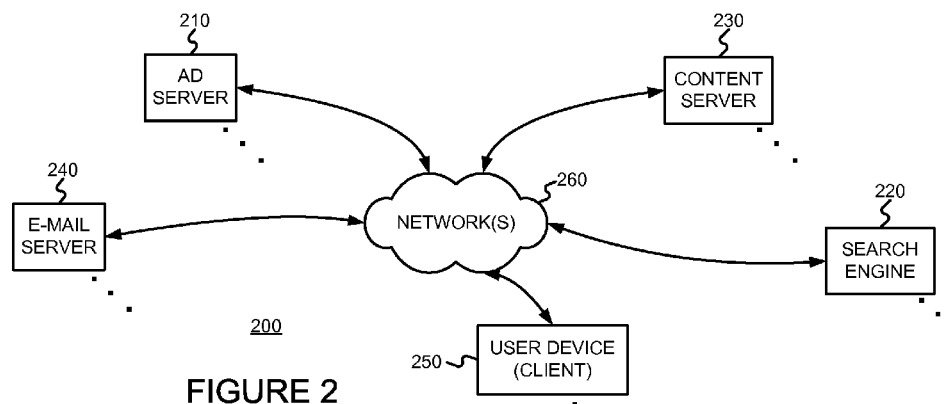
FIG. 2 is a diagram illustrating an environment in which, or with which, the present invention may operate.

The ad server 120 may be similar to the one described in FIG. 2 of U.S. patent application Ser. No. 10/375,900 (incorporated herein by reference), entitled "SERVING ADVERTISEMENTS BASED ON CONTENT," filed on Feb. 26, 2003 and listing Darrell Anderson, Paul Bucheit, Alex Carobus, Claire Cui, Jeffrey A. Dean, Georges R. Harik, Deepak Jindal, and Narayanan Shivakumar as inventors. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, geolocation information, user profile information, etc.), and price information (e.g., maximum cost (cost per click-though, cost per conversion, etc.)). Alternatively, or in addition, each ad group may include an average cost (e.g., average cost per click-through, average cost per conversion, etc.). Therefore, a single maximum cost and/or a single average cost may be associated with one or more keywords, and/or topics. As stated, each ad group may have one or more ads or "creatives" (That is, ad content that is ultimately rendered to an end user). Each ad may also include a link to a URL (e.g., a landing Web page, such as the home page of an advertiser, or a Web page associated with a particular product or server). Naturally, the ad information may include more or less information, and may be organized in a number of different ways.

FIG. 2 illustrates an environment 200 in which the present invention may be used. A user device (also referred to as a "client" or "client device") 250 may include a browser facility (such as the Explorer browser from Microsoft, the Opera Web Browser from Opera Software of Norway, the Navigator browser from AOL/Time Warner, etc.), an e-mail facility (e.g., Outlook from Microsoft), etc. A search engine 220 may permit user devices 250 to search collections of documents (e.g., Web pages). A content server 210 may permit user devices 250 to access documents. An e-mail server (such as Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220. However, content-relevant ads may be served in association with content provided by the content server 230, and/or e-mail supported by the e-mail server 240 and/or user device e-mail facilities.

As discussed in U.S. patent application Ser. No. 10/375, 900 (introduced above), ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, click-through or not, impression time, impression date, size, conversion or not, etc.) back to the ad server 120/210. Alternatively, or in addition, such information may be provided back to the ad server 120/210 by some other means.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate, and/or as described below, information related to, and/or derived from, the search query), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where, and/or how the ad was to be rendered (e.g., position, click-through or not, impression time, impression date, size, conversion or not, etc.) back to the ad server 120/210. As described below, such information may include information for determining on what basis the ad way determined relevant (e.g., strict or relaxed match, or exact, phrase, or broad match, etc.) Alternatively, or in addition, such information may be provided back to the ad server 120/210 by some other means.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under over, or otherwise in association with an e-mail.

Although the foregoing examples described servers as (i) requesting ads, and (ii) combining them with content, one or both of these operations may be performed by a client device (such as an end user computer for example).

§4.1.2 Definitions

Online ads, such as those used in the exemplary systems described above with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geolocation, the language used by the user, the type of browser used, previous page views, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, on what basis the ad was determined relevant, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain geolocation, etc. As another example, in some systems, an advertiser may specify that its ad is to be served only if a page or search query includes certain keywords or phrases (referred to generally as "keyword targeting criteria"). As yet another example, in some systems, an advertiser may specify that its ad is to be served only if a document being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to, or perceived by, an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

"User information" may include user behavior information and/or user profile information. It may also include a user's geolocation, or an estimation of the user's geolocation.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Various exemplary embodiments of the present invention are now described in §4.2.

§4.2 Exemplary Embodiments

The present invention may be used to relax the notion of a match between search query information and targeting information, such as keyword targeting criteria. The present invention may do so using various techniques, described below. As will be appreciated by those skilled in the art, at least some of these techniques may be used alone, or in combination.

The present invention may also be used to adjust a score of an ad depending upon the type of match used to find that the ad was relevant to search query information. For example, the score of an ad determined to be relevant on the basis of a more relaxed notion of match may be decreased and/or the score of an ad determined to be relevant on the basis of a stricter notion of match may be increased.

The present invention may adjust the score of such ads using various techniques, described below. As will be appreciated by those skilled in the art, at least some of these techniques may be used alone, or in combination. The ad score may be adjusted using a score adjustment parameter. The score adjustment parameter may be associated with a {word-to-related word} mapping. The present invention may also be used to revise the score adjustment parameter, for example by using past performance information of ads served using the {word-to-related word} mapping. The present invention may update the adjustment parameter using various techniques, described below. As will be appreciated by those skilled in the art, at least some of these techniques may be used alone, or in combination.

Figure 3:
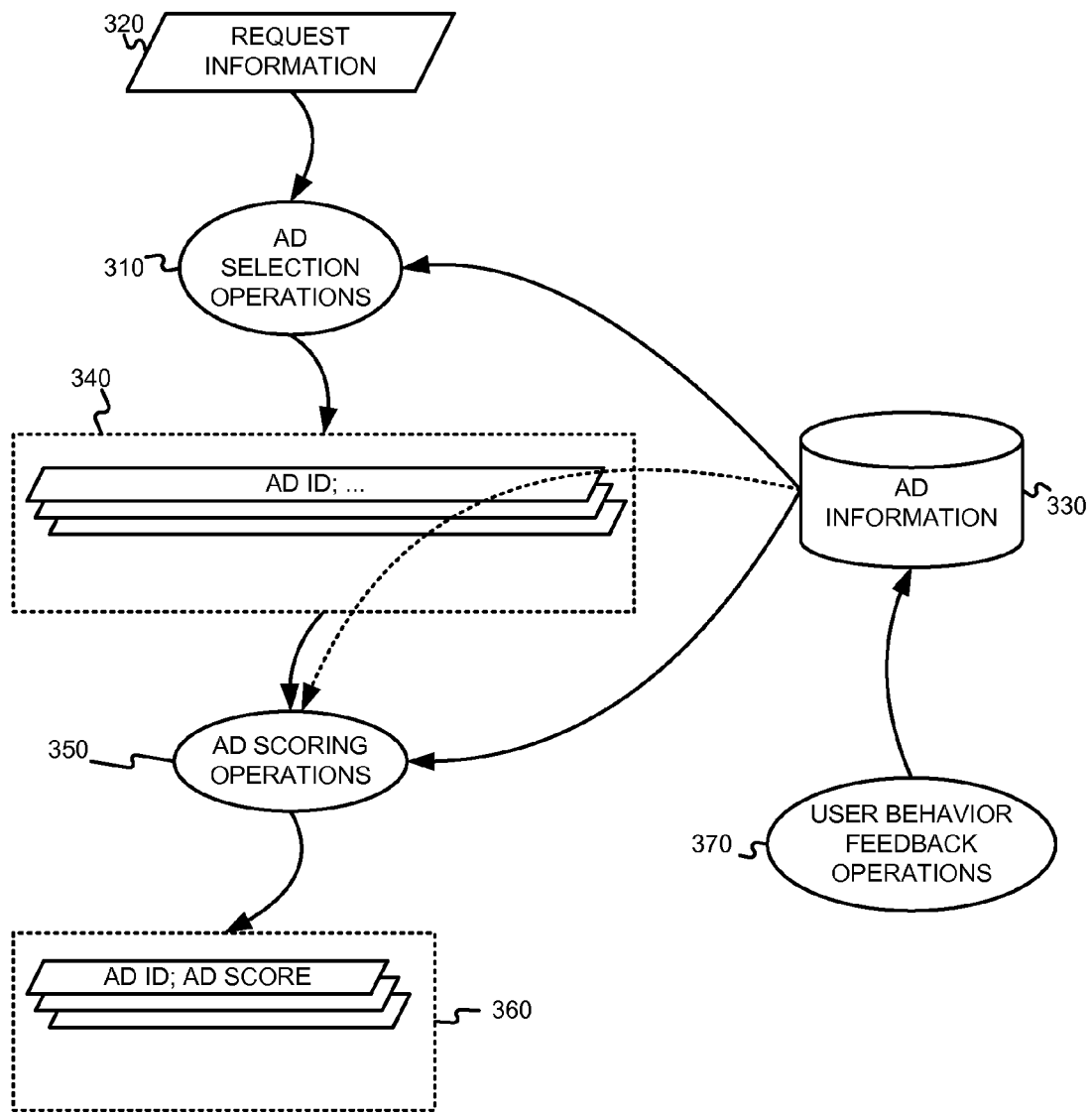
FIG. 3 is a bubble diagram of an ad serving system in which, or with which, the present invention may operate.

FIG. 3 is a bubble diagram of an ad serving system in which, or with which, the present invention may operate. Ad selection operations 310 may be used to generate a set of one or more ads 340 using ad information 330 and ad request information 320. In an exemplary embodiment of the present invention, the set of ads 340 may include ads relevant to the request information 320. For example, if the request information 320 is associated with a search query, the ads 340 may be relevant to words and/or phrases of the search query. Alternatively, if the request information 320 is associated with a document to be served, the ads 340 may be relevant to content of the document. The request information 320 may include additional information such as user information, geolocation information, etc.

Ad scoring operations 350 may be used to generate a set 360 of ads and associated scores using the first set 340 of ads and ad information 330. The scoring operation 350 may consider various ad information such as one or more of price information (e.g., maximum price per impression, maximum price per selection, maximum price per conversion, etc.), performance information (e.g., click-through rate, conversion rate, etc.), advertiser quality information, etc. In one embodiment, the ad score is a reflection of revenue expected if the ad is served.

Figure 4:
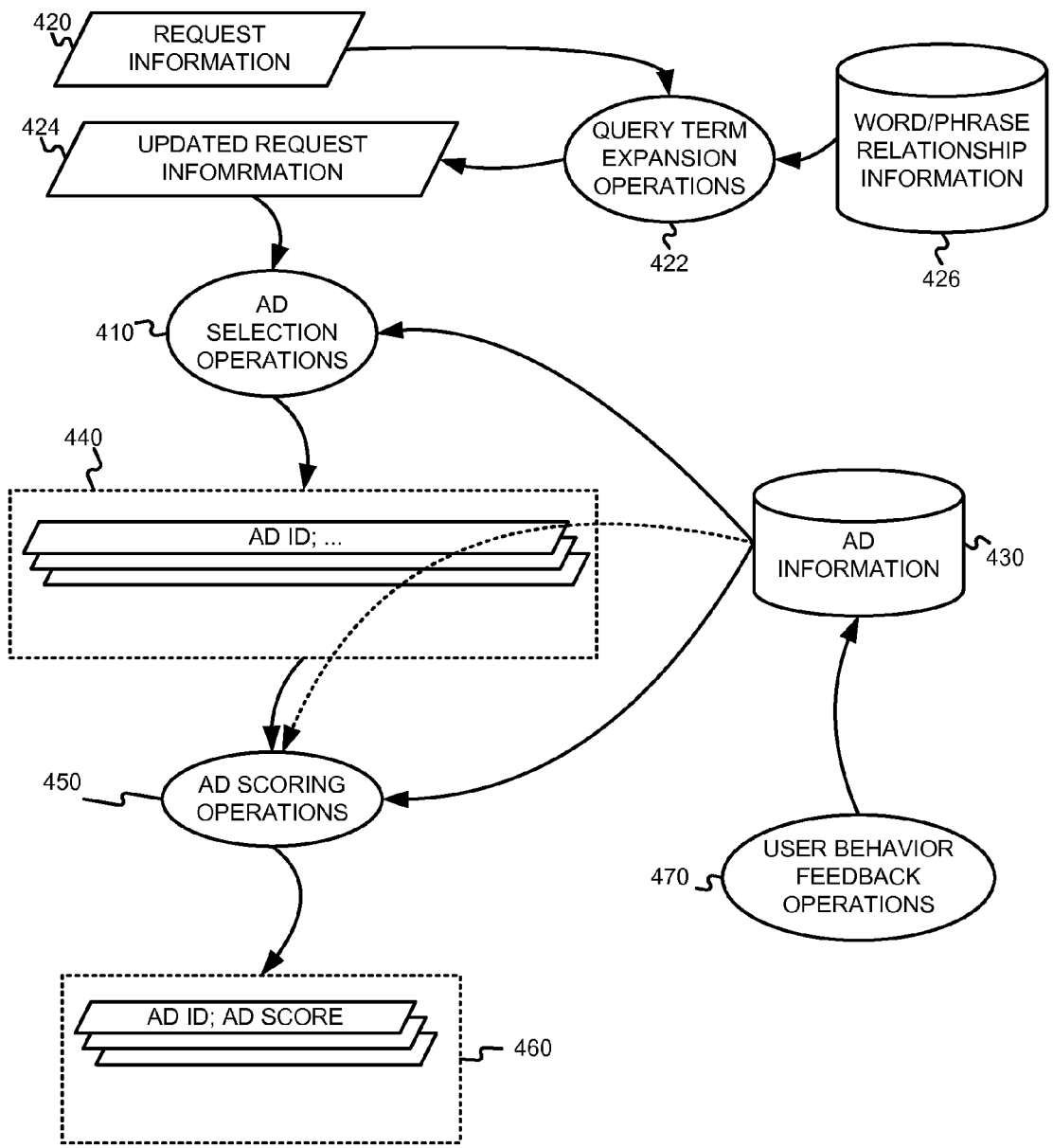
FIG. 4 is a bubble diagram of a modification of the ad serving system of FIG. 3 in a manner consistent with the present invention.

Consistent with the present invention, the ad selection operations 310 may use a relaxed notion of relevancy, particularly in the context of ads targeted to keywords extracted from a search query. For example, as shown in the bubble diagram of FIG. 4, query term expansion operations 422 may use word/phrase relationship information 426 to generate updated request information 424 from request information 420. Exemplary data structures for storing word/phrase relationship information 426 are described in §4.2.1 below with reference to FIG. 7. Exemplary methods for performing query term expansion operations are described in §4.2.2 below with reference to FIG. 11.

Although not necessary, scoring operations 350 may also consider ad relevance information. For example, as shown in the bubble diagram of FIG. 5 (which does not show query expansion operations and ad selection operations), scoring operations 550 may consider score adjustment parameters 535. Score adjustment parameters may be maintained for {word-to-related word} associations (across all ads or some groupings of ads) 526. For example, in the context of a keyword targeted ad serving system, the ad scoring operations 550 may consider whether keyword targeting information associated with the ad exactly matched a phrase of the search query, a word of the search query, a word derived from a word of the search query, a word related to a word of the search query (and perhaps some measure of relatedness), a word related to a word derived from a word of the search query (and perhaps some measure of relatedness), etc. Finally, score adjustment parameter update operations 580 may be used to update the score adjustment parameters 535 using user behavior feedback. Exemplary methods that may be used to perform the ad scoring operations 550 are described in §4.2.2 below with reference to FIG. 12.

Figure 5:
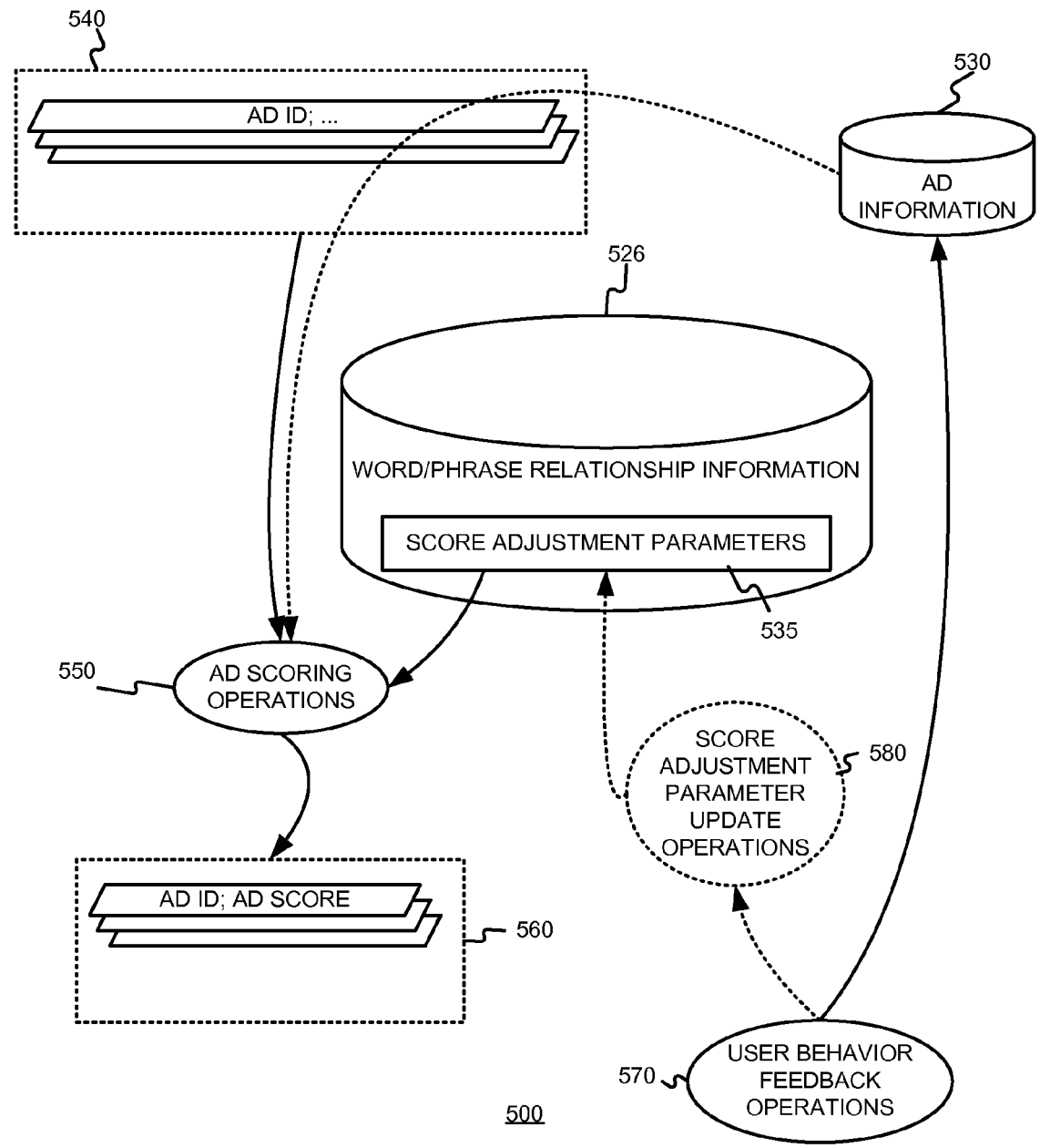
FIG. 5 is a bubble diagram of a modification of a part of the ad serving system of FIG. 4 in a manner consistent with the present invention.

Although not shown in FIG. 5, score adjustment may be effected by adjusting a parameter (e.g., price information, performance information, etc.) of an ad which is used in ad scoring operations 450/550.

Figure 6:
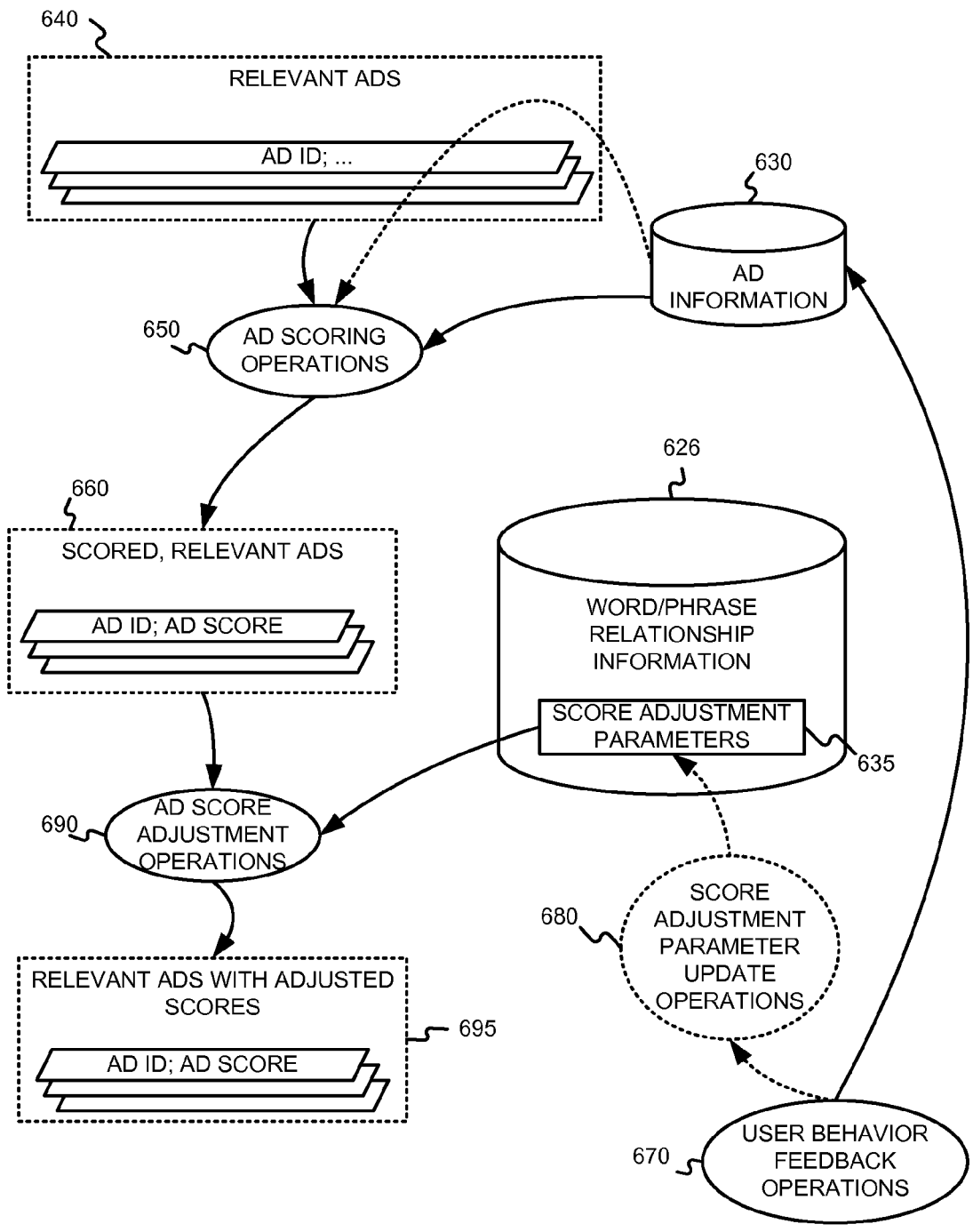
FIG. 6 is a bubble diagram of a modification of a part of the ad serving system of FIG. 3 or 4, in a manner consistent with the present invention.

Referring to the bubble diagram of FIG. 6 (which does not show query expansion operations and ad selection operations), ad scoring operations 650 may determine scored relevant ads 660 as did those operations 350 of FIG. 3. However, in this case, ad score adjustment operations 690 may be provided to adjust the ad scores after scoring, using the score adjustment parameters 635. Exemplary methods that may be used to perform the ad scoring adjustment operations 690 are described in §4.2.2 below with reference to FIG. 13.

Although not shown, in one embodiment of the invention, if the word related to a word in the original search query that matched a targeting keyword appears in the ad creative, it may be emphasized (e.g., depicted with bold typeface text). This may be done, for example, using techniques described in U.S. patent application Ser. No. 10/261,294 (incorporated herein by reference), titled "ACCENTUATING TERMS OR FEATURES OF INTEREST IN AN ADVERTISEMENT," filed on Sep. 30, 2002 and listing Nina Marie Kim as the inventor. Similarly, if a targeting keyword exactly matches a word from the original search query, any instances of that targeting keyword in the ad creative may be emphasized. The types of emphasis may be the same or different.

The present invention need not provide, and/or use all of the operations and information described with reference to FIGS. 3-6. The present invention need not perform the operations in the order shown. Finally, the present invention may combine, or separate functionality described with respect to the various operations. For example, the ad selection and scoring operations 410 and 450 of FIG. 4 may be combined into a single operation.

§4.2.1 Exemplary Data Structures

Figures 7, 8:
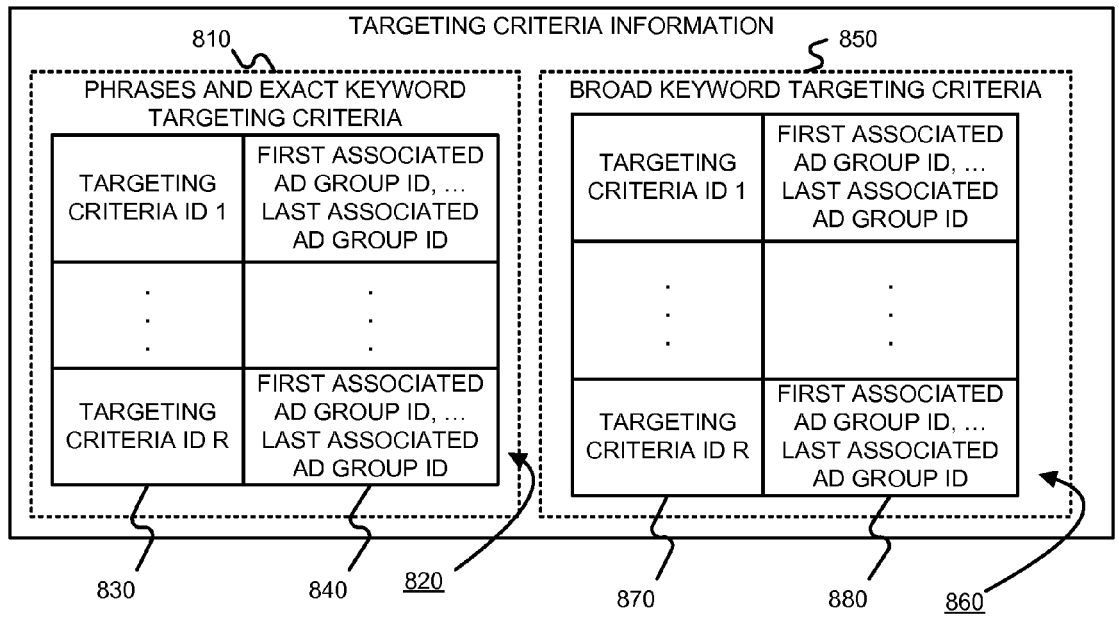
FIG. 7 illustrates an exemplary data structure that is consistent with the present invention, for storing exemplary word/phrase relationship information that may be used in the system of FIG. 4.
FIG. 8 illustrates an exemplary data structure that is consistent with the present invention, for storing keyword targeting information that may be used in the system of FIG. 3.

FIG. 7 illustrates exemplary word/phrase relationship information 426' that is consistent with the present invention. The information 426' includes a number of entries 710. Each of the entries may include a word identifier (or simply the word) 720 and the identifiers of one or more words (or simply the words) 730 related to the word 720. A weight representing some notion of the degree of relatedness between the word 720 and each of the one or more words 730 may also be provided. In one embodiment, the weight may be the probability that the two words will both appear (i.e., co-occur) in a session including one or more search queries.

In one embodiment of the present invention, there are almost seven million words in a lexicon. Word identifiers 720 start at 0 and are ordered by decreasing frequency. The lexicon may also include common n-grams (also referred to as "words" in the specification without loss of generality), represented as hyphenated compounds. Lexicon methods (not described in detail here) may be used to transform text into a sequence of lexicon ids, and intelligently finding the most probable compounds to use. For words that aren't included in the lexicon, a representation (e.g., a negated 31-bit fingerprint of the actual text) may be provided. This will allow advertisers to use keywords that aren't in the lexicon.

The information 426' may be a sorted map which, for each word in the lexicon, contains compressed information about which other words are "related" to it. In one embodiment of the present invention, the definition of relatedness is that the two words tend to co-occur in consecutive queries from the same session (e.g., based on query logs from a given period, such as a recent six month period). As will be described below, this (somewhat synonym-like) notion of relatedness may be used to assign initial weights for query term expansion (also referred to as "query rewriting"). As will also be described below, performance (e.g., click-through) data may be used to improve the weights (e.g., in offline-post-processing).

As shown in FIG. 8, ad targeting criteria information 800 may include phrase and exact keyword targeting information 810 and broad keyword targeting criteria information 850. The phrases and exact keyword targeting criteria information 810 may include a number of entries 820. Each of the entries 820 may include a targeting criteria identifier (e.g., a word identifier) 830 and one or more associated ad identifiers (or ad group identifiers) 840. Similarly, the broad keyword targeting criteria information 850 may include a number of entries 860. Each of the entries 860 may include a targeting criteria identifier (e.g., a word identifier) 870 and one or more associated ad identifiers (or ad group identifiers) 880. In this way, if a one or more terms of a search query match various targeting criteria, it may be assumed that certain ads (or ad groups) are relevant to the search query. In one embodiment of the present invention, phrases and exact keyword targeting criteria information are indexed by their ordered fingerprint, and broad targets are indexed by their rarest word (actually the biggest lexicon identifier). Such an embodiment permits all subset matches for a given search query to be found easily. If targeting criteria identifiers are associated with ad groups, ad groups 920 can be mapped to one or more ads 930, as illustrated by entries 910 of data structure 900 of FIG. 9.

Referring back to FIG. 4, information 440 about one or more ads may be generated or otherwise output by ad selection operations 410. Referring to FIG. 10, this information may be represented by data structure 1000. The data structure may include a number of entries 1010, one for each ad. An entry 1010 may include an ad identifier 1020, information about the ad 1030, a match type (e.g., exact, phrase, broad, and relaxed-broad; or normal and relaxed) 1040. If the match type 1040 is relaxed-broad in the one example, or relaxed in the other, the entry 1010 may also include a score adjustment parameter 1050. Generally, the score adjustment parameter 1050 may be used to discount the score of ads that matched the search query only under a relaxed notion of relevance relative to those ads that matched the search query under a stricter notion of relevance.

§4.2.2 Exemplary Methods

Figure 11:
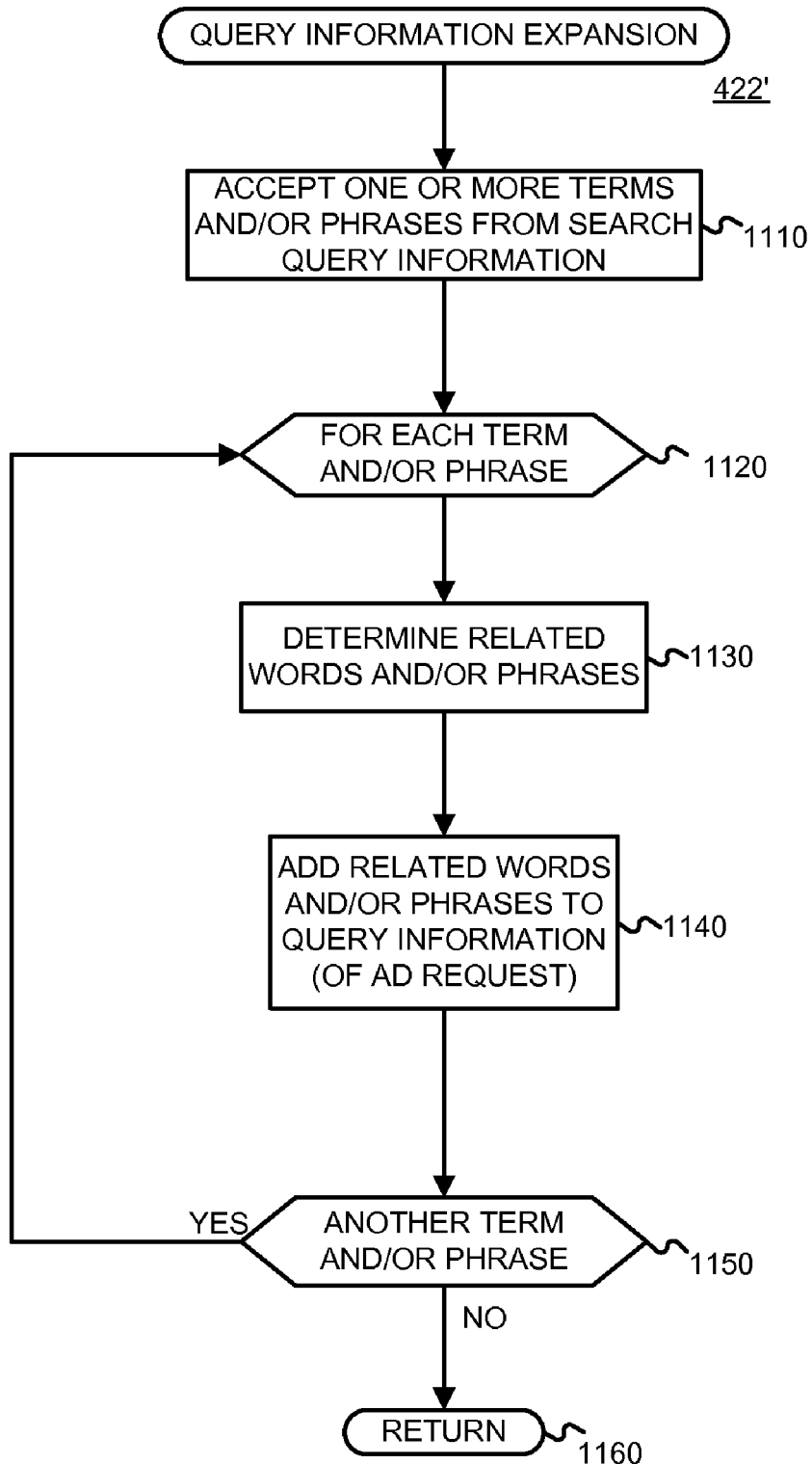
FIG. 11 is a flow diagram of an exemplary method for performing a query information expansion operation in a manner consistent with the present invention.

FIG. 11 is a flow diagram of an exemplary method 422' for performing query information expansion operations 422 in a manner consistent with the present invention. One or more terms and/or phrases are accepted from search query information. (Block 1110) As indicated by loop 1120-1150, a number of steps may be performed for each term and/or phrase. For example, related words and/or phrases may be determined (Block 1130) and added to the query information (e.g., of an ad request) (Block 1140). After all of the terms and/or phrases have been processed, the method 422' is left. (Node 1160)

Referring back to block 1130, related words and/or phrases can be determined using a mapping such as that 700 described above with reference to FIG. 7. Recall, for example, that this mapping (and weights) may have been generated using search query session word co-occurrence information. Referring back to block 1140, the weight information (or some score adjustment parameter) may be provided with an ad request. The query information expansion method 422' may apply some threshold (absolute and/or relative) or other test to limit the extent of query term expansion.

Figure 12:
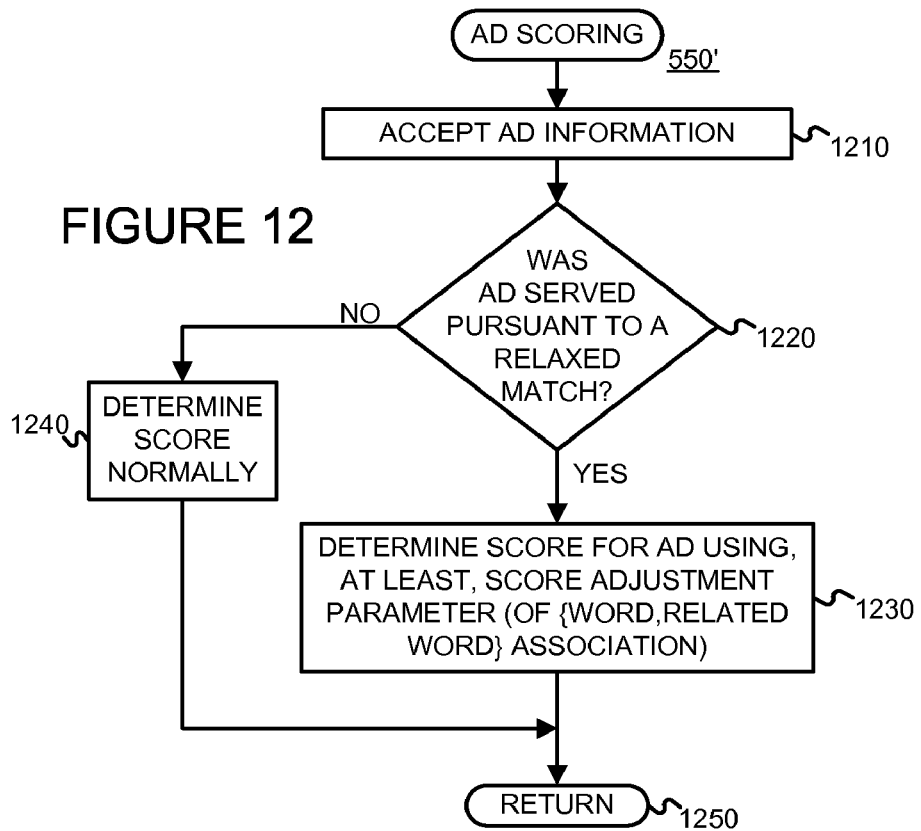
FIG. 12 is a flow diagram of an exemplary method for performing an ad scoring operation in a manner consistent with the present invention.

FIG. 12 is a flow diagram of an exemplary method 550' for performing an ad scoring operation 550 in a manner consistent with the present invention. Ad information may be accepted. (Block 1210) Recall, for example, the exemplary ad information data structure 1000 of FIG. 10. Then, it may be determined whether the ad was served pursuant to a relaxed match. (Decision block 1220) If so, the score for an ad may be determined using at least the score adjustment parameter (if any) (e.g., one associated with the {word-to-related word} association) (Block 1230) before the method 550' is left (Node 1250). Otherwise, the score is determined normally (Block 1240) before the method 550' is left (Node 1250). Thus, for example, if an ad score is normally a function of at least one of (a) price information, (b) performance information, and/or (c) advertiser quality information, it may further be a function of a score adjustment parameter if the ad was served pursuant to a relaxed match. For example, the performance information may be adjusted using the score adjustment parameter. More specifically, if the score adjustment parameter is a value less than one, the performance information (and therefore the score) may be discounted by multiplying it by the score adjustment parameter. Naturally, some other component of an ad score may be adjusted using the score adjustment parameter.

Figure 13:
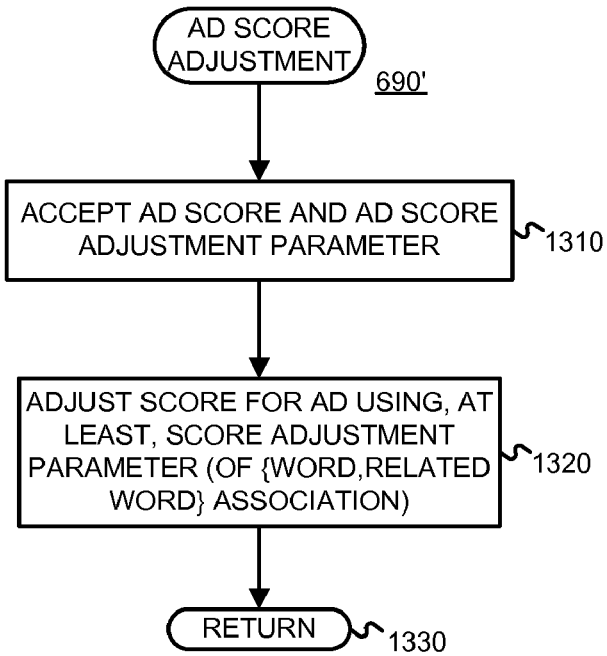
FIG. 13 is a flow diagram of an exemplary method for performing an ad score modification operation in a manner consistent with the present invention.

Recall from FIG. 6 that rather than applying a score adjustment parameter at the time of scoring, it can be applied after an initial score has been determined. FIG. 13 is a flow diagram of an exemplary method 690' for performing an ad score modification operation 690 in a manner consistent with the present invention. An ad score and a score adjustment parameter may be accepted 1310. Then, the ad score may be adjusted (e.g., discounted) using, at least, the score adjustment parameter (Block 1320) before the method 1300 is left (Node 1330). Naturally, for an ad that was served pursuant to a match other than a relaxed match, its score need not be adjusted (e.g., discounted).

In the exemplary methods of FIGS. 12 and 13, score adjustment parameters may maintained for one or more of {word-to-related word} mappings (across all ads or some groupings of ads).

Figure 14:
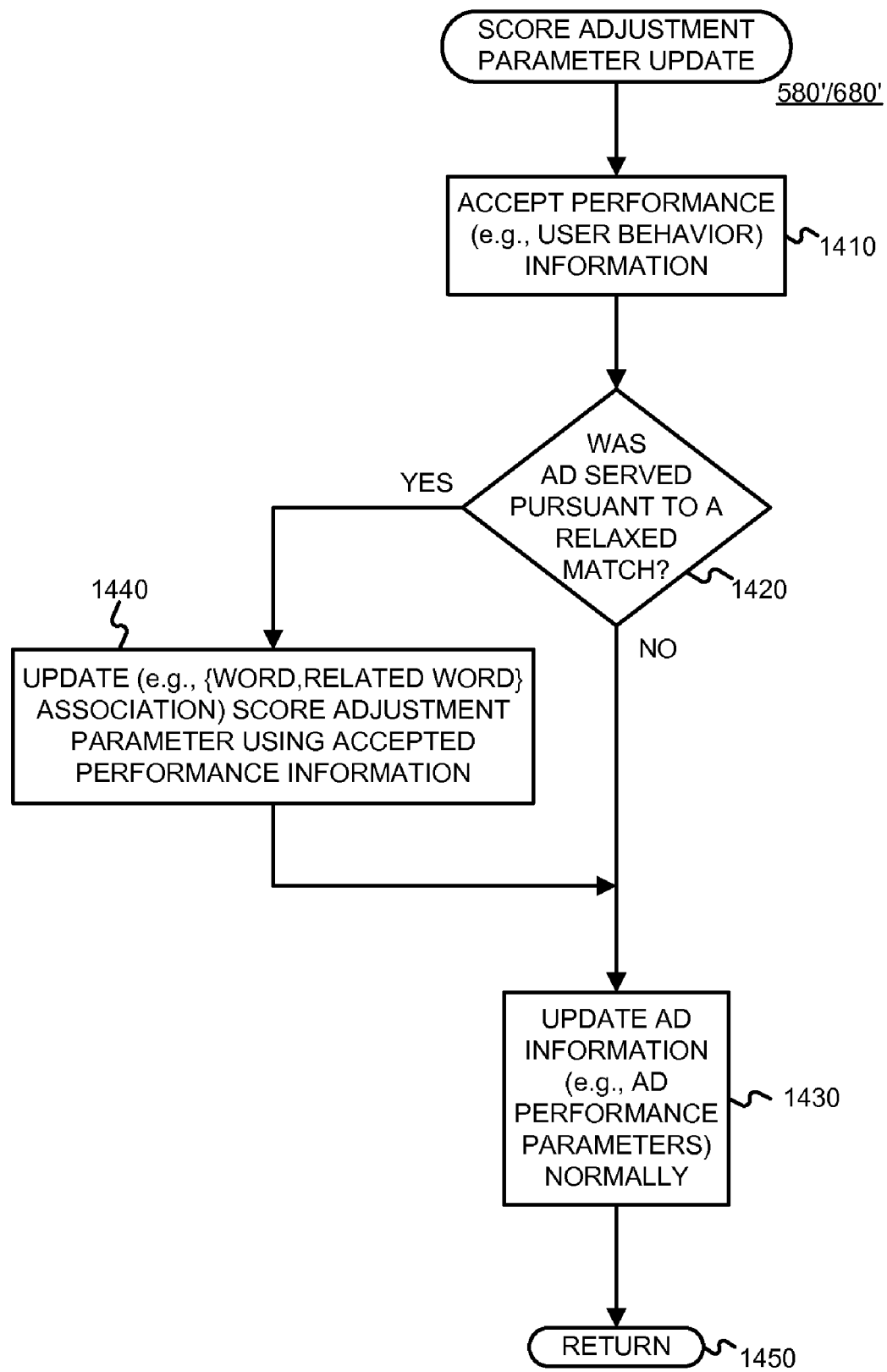
FIG. 14 is a flow diagram of an exemplary method for performing an ad score adjustment parameter update operation in a manner consistent with the present invention.

Recall that an ad score may be determined or adjusted using a score adjustment parameter. For example, if an ad is served pursuant to a relaxed notion of a match (rather than a stricter match such as an exact match), its score can be discounted relative to an ad served pursuant to the stricter match. For example, the score (or a "score component" used in the determination of a score) can be discounted by multiplying it by a score adjustment parameter having a value of less than one. Initially, the score adjustment parameter may be based on a {word-to-related word} search query session co-occurrence probability. However, over time it may be possible to gather information about how well ads served pursuant to a relaxed notion of match (e.g., relaxed by expanding the search query information to included related words) perform. FIG. 14 is a flow diagram of an exemplary method 580'/680' for performing an ad score adjustment parameter update operation in a manner consistent with the present invention. Performance information (e.g., with respect to an ad, with respect to a {word-to-related word} mapping, with respect to a particular ad served pursuant to a match with a particular word related to a particular search query word, etc.) is accepted. (Block 1410) For the accepted performance information, it may be determined whether or not the ad was served pursuant to a relaxed notion of match. (Decision block 1420) If not (e.g., if the ad was served pursuant to a more strict match), the ad information (e.g., performance parameters) are updated as they normally are (Block 1430) before the method 580'/680' is left (Node 1450). Referring back to decision block 1420, if, on the other hand, the ad was served pursuant to a relaxed notion of match, the score adjustment parameter may be updated using the accepted performance information. (Block 1440) The ad information (e.g., performance parameters) may also be updated (Block 1430) before the method 580'/680' is left (Node 1450).

In one embodiment of the present invention, the score adjustment parameter may be a multiplier (referred to as a "rewrite multiplier" since the search query is effectively rewritten), and the performance information may be click-through data. In this case, a predicted click-through may be the product of a naively predicted click-through and a rewrite multiplier. Therefore, the method 580'/680' may be used to update rewrite multipliers in view of observed click-through data. For example, consider a rewrite (source word->related target word). Ad serving logs may be examined to find impressions of ads that were targeted pursuant to this rewrite (i.e., ads with targeting criteria that matched the "related target word" but not the "source word"). It would be useful to predict what would happen if the rewrite incurred no penalty at all. That is, how many clicks could be expected from such impressions? To this end, for each impression, a rewrite_clickthrough( ), which is just the clickthrough( ) without the rewrite_multiplier, may be logged. The estimate predicted_clicks (e.g., naively predicted clicks) may be the sum, over all the impressions, of their rewrite_clickthrough( )s. This is how many clicks could be expected from these impressions if there were no penalty associated with the rewrite. The predicted_clicks could be compared to observed_clicks (i.e., the number of clicks we actually observed among these impressions). Finally, the multiplier may be adjusted as follows:

$$\text{new\_multiplier} = \frac{N \cdot \text{initial\_multiplier} + \text{observed\_clicks}}{N + \text{naively\_predicted\_clicks}}$$

The "initial_multiplier" may be a best guess for the multiplier, such as a guess made before any empirical click data becomes available. This initial guess may be determined using how often (or a probability that) words co-occurred in query logs. The "observed_clicks" may be the total number of clicks observed for ads targeted using the given rewrite. The "naively_predicted_clicks" may be the total number of clicks expected among ads targeted using this rewrite, if it were naively assumed that the rewrite had no adverse effect on click probability. Naively_predicted_clicks may be determined by summing the naive click probabilities for each ad.

In one embodiment of the present invention, N is five (5) or approximately five (5). If N is relatively large, the predicted_clicks are weighted heavily and the trend towards empirical data will be slower. Conversely, if N is relatively small, the predicted-clicks have very little weight, and the trend towards the empirical data will be faster. This updating scheme treats the initial multiplier as if it was calculated on the basis of N predicted clicks. As observed data becomes available, the new_multiplier is moved smoothly to the empirical data, depending on how much data is available. Accordingly, as the number of observed_clicks and impressions get large, this formula causes the new_multiplier to converge to:

$$\frac{\text{observed\_clicks}}{\text{naively\_predicted\_clicks}}$$

which is the "true" empirical multiplier. Thus, after a large amount of empirical data has been considered, the initial multiplier has little or no impact at all. Naturally, other functions that converge to observed-clicks/predicted-clicks (e.g., from an initial estimate) may be used instead.

It will take longer to learn "correct" rewrite multipliers for uncommon words since it will take longer to gather empirical data.

Naturally, these methods can be applied to score adjustment parameters other than multipliers and performance information other than clicks.

§4.2.3 Exemplary Apparatus

Figure 15:
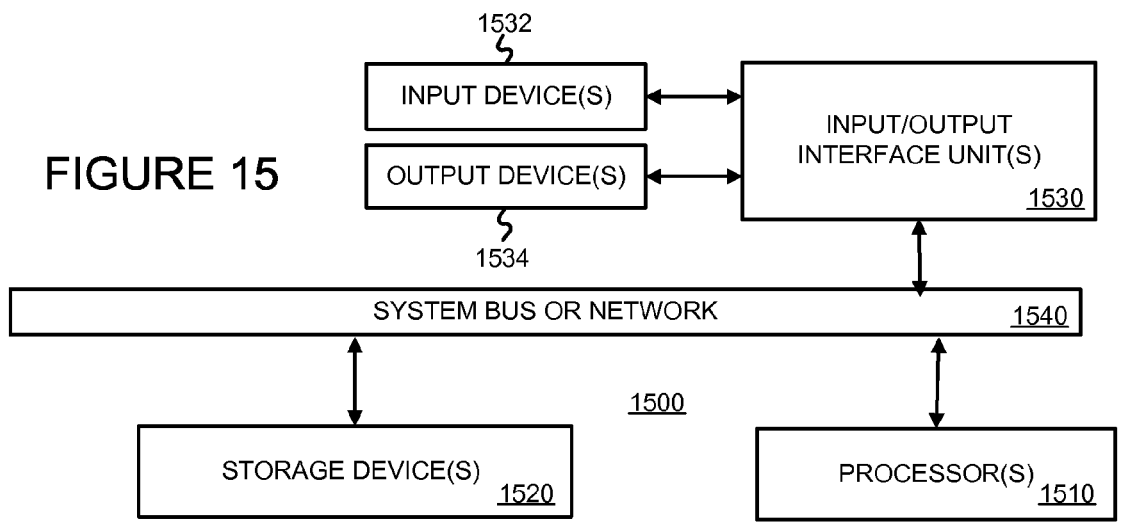
FIG. 15 is a block diagram of an exemplary apparatus that may perform various operations in a manner consistent with the present invention.

FIG. 15 is high-level block diagram of a machine 1500 that may perform one or more of the operations discussed above. The machine 1500 basically includes one or more processors 1510, one or more input/output interface units 1530, one or more storage devices 1520, and one or more system buses and/or networks 1540 for facilitating the communication of information among the coupled elements. One or more input devices 1532 and one or more output devices 1534 may be coupled with the one or more input/output interfaces 1530.

The one or more processors 1510 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1520 and/or may be received from an external source via one or more input interface units 1530.

In one embodiment, the machine 1500 may be one or more conventional personal computers. In this case, the processing units 1510 may be one or more microprocessors. The bus 1540 may include a system bus. The storage devices 1520 may include system memory, such as read only memory (ROM) and/or random access memory (RAM). The storage devices 1520 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1532, such as a keyboard and pointing device (e.g., a mouse) for example. Other input devices such as a microphone, a joystick, a game pad, a satellite dish, a scanner, or the like, may also (or alternatively)

be included. These and other input devices are often connected to the processing unit(s) 1510 through an appropriate interface 1530 coupled to the system bus 1540. The output devices 1534 may include a monitor or other type of display device, which may also be connected to the system bus 1540 via an appropriate interface. In addition to (or instead of) the monitor, the personal computer may include other (peripheral) output devices (not shown), such as speakers and printers for example.

§4.2.4 Alternatives and Extensions

Although many of the foregoing examples discounted the scores of ads served pursuant to a relaxed notion of matching, other ways of accomplishing the same relative affect on scores (e.g., enhancing the scores or ads served pursuant to a more strict match of a word or phrase in the original search query) may be used. Generally, ads served pursuant to a relaxed notion of matching may be considered less relevant than those served pursuant to a strict notion of matching. Their scores may be adjusted accordingly. Note, however, that if ads served pursuant to a relaxed notion of relevance (e.g., using a word related to a search query word) perform better than those served pursuant to a strict notion of relevance, the scores of such ads may be enhanced relative to ads served pursuant to a strict match.

Although the score modification parameter was described as a rewrite multiplier being associated with a {word-to-related word} mapping, alternatively, or in addition, score modification parameters may be associated with the or more of ads served pursuant to strict matching (across all words or some groupings of words), ads served pursuant to relaxed matching (across all words or some groupings of words), etc.

Although described above with reference to keyword-targeted ads, the teachings of the present invention can be applied to content-targeted ads. In such an application, concepts and/or topics can be expanded to related concepts and/or topics (similar to the way words are expended to related words). The scores of content-targeted ads served pursuant to a relaxed notion of concept match may be adjusted similarly.

Although described with reference to ads and scoring ads, the present invention may also be used in the context of general information retrieval—finding documents that relate to a search query. Thus, the present invention may be used to find (and perhaps score) relevant documents. However, the present invention is especially effective for small documents, such as ads, where exact matches for the words in a search query are less likely.

The present invention may provide an advertiser with the option of turning off relaxed ad serving. In this way, if a particular advertiser is unhappy with the results of relaxed ad serving, they may specify that only phrase matching, exact matching, and/or some other broad matching be used instead.

In one embodiment of the invention, ad quality weighting and revenue weighting may be tuned. For example, if the present invention is used by an ad serving system that is used by different search engines or different content owners, each may be provided with the opportunity to emphasize quality and/or revenue. Quality may be increased by increasing a threshold performance parameter (e.g., filtering ads using a minimum clickthrough rate). However, since less ad serving may result in less revenue, another option is to permit a threshold performance parameter (e.g., clickthrough rate) to be adjusted (e.g., increased) for ads served pursuant to the relaxed matching scheme of the present invention independent of performance thresholding applied to ads served pursuant to other notions of matching (e.g., phrase, exact, etc.).

The present invention may be used in a system employing (a) exact matching (where the query must be identical the keyword targeting criterion), (b) phrase matching (where the query must contain the targeting criterion words in the order specified by the phrase) and/or (c) broad matching (where the query must contain the any one of one or more of the targeting criterion keywords, in any order). For example, the relaxed notion of matching used by the present invention may be used instead or, or in addition to, broad matching.

The present invention may be used in concert with other techniques, such as "compounding" for example. With compounding, common n-grams (Steve-Jobs, bok-choy, etc.) in search queries and/or targeting criteria may be treated as entities separate from their constituent words. In this way, a query for "steve jobs" would not return ads related to jobs in the context of employment.

§4.3 Example of Operations

The following example illustrates the utility of an exemplary embodiment of the present invention. In this example, the Iditarod is a dog-sledding race which takes place annually in Alaska. A user submitting a search query containing the word "Iditarod" may be traveling to Alaska. Consequently, the user may be interested in flights, hotels, and restaurants in Alaska. Ads which broadly target the keyword targeting criterion "Alaska" would be good candidates to serve for rendering to the user, even through their search query did not include the word "Alaska". It is realistic to assume that many Alaska-related advertisers might lack the foresight to explicitly include "Iditarod" among their keyword targeting criteria. Consequently, there may be many lost opportunities to serve relevant ads.

Figure 16:
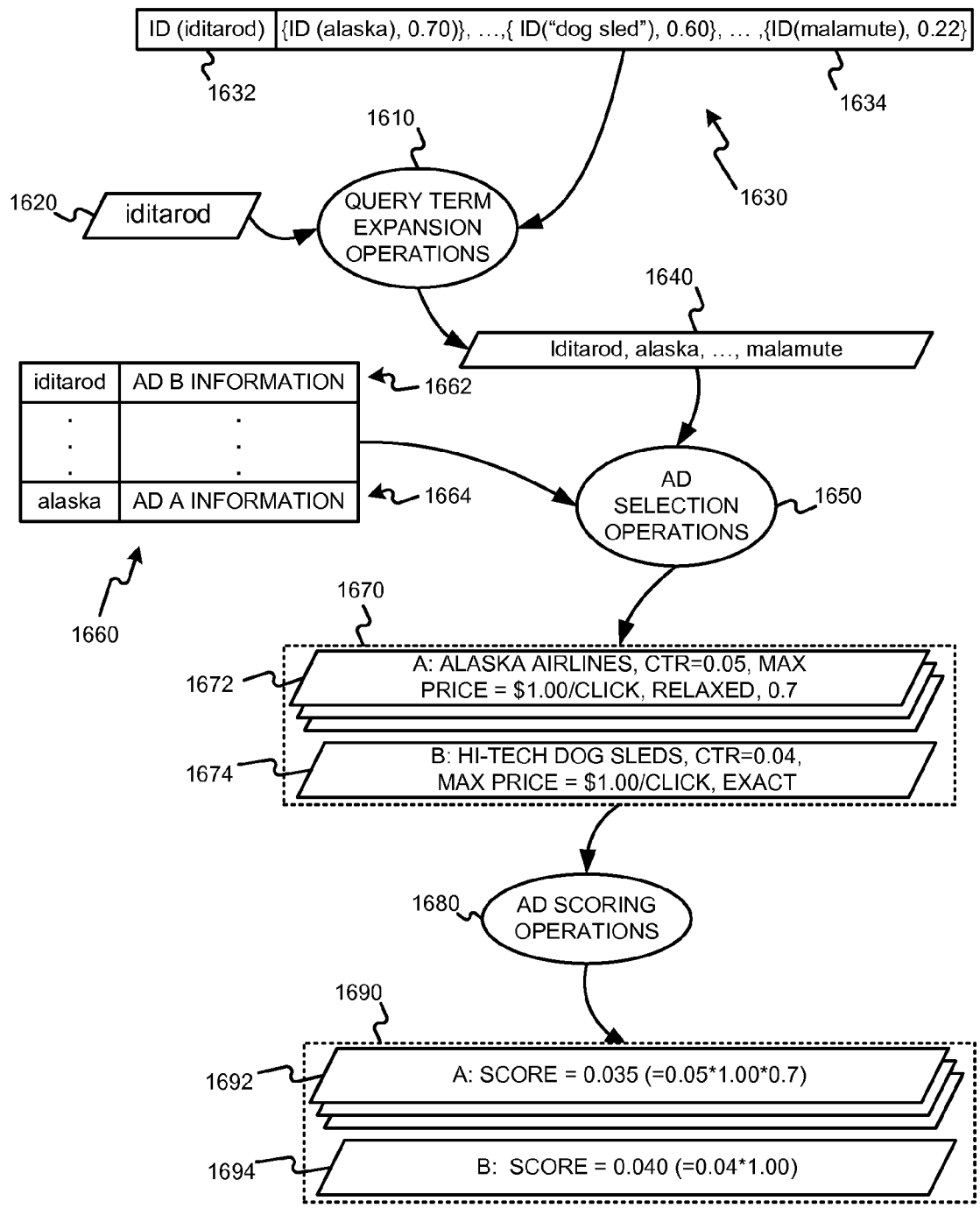
FIG. 16 illustrates an example of operations of an exemplary embodiment of the present invention.

FIG. 16 illustrates ads-related processing of the search query "Iditarod" in an exemplary system. A search query 1620, possibly with a spell correction, is accepted. Lexical information about the search query may be determined and stored in an ad request. In particular, all lexicon identifiers occurring in either the raw query or its spell correction (thus forming a set of ids appropriate as the basis for rewriting) may be determined. For each of these lexicon identifiers 1632, query term expansion operations 1610 can lookup information about related words 1634 from word/phrase relationship information 1630. As illustrated in this example, the word "Iditarod" is related to the word "Alaska" with a weight of 0.70, the phrase "dog sled" with a weight of 0.60, and the word "malamute" with a weight of 0.22. This information may be provided in an ad request 1640. Note that having this data in the ad request 1640 advantageously allows access to it (e.g., by an ad server) without having to re-load the word/phrase relationship information 1630. This data may also be useful later if the ad creatives are filtered.

Now the ad request 1640, including the expanded query information, goes to one or more ad selection operations 1650 (which may be distributed and which may use shared ad information). One embodiment of the ad selection operations 1650 may be used to find all keyword targeting criteria (in ad information 1660) that "match" the expanded query information in the ad request 1640. Comparing expanded request information 1640 and ad information 1660, ad selection operations 1650 determine at least two relevant ads 1670. Ad A for "Alaska Airlines" 1672 is served because it is targeted to the word "Alaska" found in the expanded ad request information 1640. Since "Alaska" was not found in the initial search query information 1620, the ad information 1672 indicates that it was served pursuant to a relaxed match, and includes a "rewrite multiplier" of 0.7. Ad B for "Hi-Tech Dog Sleds" 1674 is served because it is targeted to the word "Iditarod" found in the expanded ad request information 1640. Since "Iditarod" was found in the initial search query information 1620, it 1674 does not include a "rewrite multiplier". Both ads include performance information (i.e., click through rates in this case) and price information (i.e., max price per click in this case).

Ad scoring operations 1680 generate scores 1690 for each of the ads. In this case, the score is the product of the click through rate, the maximum price per click, and the "rewrite multiplier" (if any). Here the score 1692 of ad A is 0.035 (=0.05*1.00*0.7), while the score of ad B is 0.040 (=0.04× 1.00). Thus, ad B has a higher score than ad A. Note that if the initial search query was "Alaska Iditarod," ad A would score 0.05 (=0.05*1.00) which would be higher than ad B's score (still 0.040)

§4.4 Conclusions

As can be appreciated from the foregoing, by relaxing the notion of a match with ad targeting keyword criteria, the present invention may be used to increase the number of relevant ads served. It may discount scores of ads served pursuant to more relaxed notions of matching relative to ads served pursuant to more strict notions of matching.

What is claimed is:

1. A computer-implemented method comprising:
   a) accepting, by a computer system including at least one computer, search query information including a word;
   b) determining, by the computer system, one or more words related to the word included in the accepted search query;
   c) generating, automatically by the computer system using a stored mapping comprising a parameter derived from past performance of ads served, an advertisement request including
      i) the word included in the accepted search query, and
      ii) the one or more words determined to be related to the word included in the accepted search query;
   d) retrieving, by the computer system, advertisements using the advertisement request;
   e) determining, by the computer system, a score for each of the retrieved advertisements using at least one of advertisement performance information and advertisement price information;
   f) adjusting, by the computer system, the scores of any advertisements retrieved on the basis of the one or more words determined to be related to the word included in the accepted search query relative to any advertisements retrieved on the basis of the word included in the accepted search query to generate adjusted scores; and
   g) serving, by the computer system, at least some of the advertisements to a client device for rendering to a user, wherein the serving is controlled, at least in part, using the adjusted scores.

2. The computer-implemented method of claim 1 wherein the act of adjusting the scores includes decreasing the scores.

3. The computer-implemented method of claim 1 wherein the act of adjusting the scores includes multiplying each of the scores by the parameter derived from past performance of ads, wherein the parameter is less than one.

4. The computer-implemented method of claim 3 further comprising:
   h) updating, by the computer system, the parameter derived from past performance of ads using at least one of advertisement selection information, or advertisement conversion information.

5. The computer-implemented method of claim 3 further comprising:
   h) updating, by the computer system, the parameter derived from past performance of ads using a function that causes the updated parameter to converge to observed user behavior relevant to performance divided by predicted user behavior relevant to performance.

6. The computer-implemented method of claim 1 wherein the act of retrieving advertisements using the advertisement request retrieves advertisements relevant to any one of the words of the generated advertisement request.

7. A computer-implemented method comprising:
   a) accepting, by a computer system including at least one computer, search query information including a word;
   b) determining, by the computer system, one or more words related to the word included in the accepted search query;
   c) generating, automatically by the computer system using a stored mapping comprising a parameter derived from past performance of ads served, an advertisement request including
      i) the word included in the accepted search query, and
      ii) the one or more words determined to be related to the word included in the accepted search query;
   d) retrieving, by the computer system, advertisements using the advertisement request;
   e) determining, by the computer system, a score for each of the retrieved advertisements using at least one of advertisement performance information and advertisement price information;
   f) adjusting, by the computer system, the scores of any advertisements retrieved solely on the basis of the one or more words determined to be related to the word included in the accepted search query relative to any advertisements retrieved on the basis of the word included in the accepted search query to generate adjusted scores; and
   g) serving, by the computer system, at least some of the advertisements to a client device for rendering to a user, wherein the serving is controlled, at least in part, using the adjusted scores.

8. The computer-implemented method of claim 7 wherein the act of adjusting the scores includes decreasing the scores.

9. The computer-implemented method of claim 7 wherein the act of adjusting the scores includes multiplying each of the scores by the parameter derived from past performance of ads, wherein the parameter is less than one.

10. The computer-implemented method of claim 9 further comprising:
    h) updating, by the computer system, the parameter derived from past performance of ads using at least one of advertisement selection information or advertisement conversion information.

11. The computer-implemented method of claim 9 further comprising:
    h) updating, by the computer system, the parameter derived from past performance of ads using a function that causes the updated parameter to converge to observed user behavior relevant to performance divided by predicted user behavior relevant to performance.

12. The computer-implemented method of claim 7 wherein the act of retrieving advertisements using the advertisement request retrieves advertisements relevant to any one of the words of the generated advertisement request.

13. Apparatus comprising:
    a) an input for accepting search query information including a word;
    b) at least one processor; and
    c) at least one storage device storing machine executable instructions which, when executed by the at least one processor, perform a method including, 1) determining one or more words related to the word included in the accepted search query,
2) generating, automatically using a stored mapping comprising a parameter derived from past performance of ads served, an advertisement request including
   i) the word included in the accepted search query, and
   ii) the one or more words determined to be related to the word included in the accepted search query,
3) retrieving advertisements using the advertisement request,
4) determining a score for each of the retrieved advertisements using at least one of advertisement performance information and advertisement price information,
5) adjusting the scores of any advertisements retrieved on the basis of the one or more words determined to be related to the word included in the accepted search query relative to any advertisements retrieved on the basis of the word included in the accepted search query to generate adjusted scores, and
6) serving at least some of the advertisements to a client device for rendering to a user, wherein the serving is controlled, at least in part, using the adjusted scores.

14. The apparatus of claim 13 wherein the act of adjusting uses the parameter derived from past performance of ads, the method further including
   7) updating the parameter using at least one of advertisement selection information, or advertisement conversion information.

15. The apparatus of claim 13 wherein the act of adjusting uses the parameter derived from past performance of ads, the method further including
   7) updating the parameter using a function that causes the updated parameter to converge to observed user behavior relevant to performance divided by predicted user behavior relevant to performance.

16. The apparatus of claim 13 wherein the act of retrieving advertisements using the advertisement request retrieves advertisements relevant to any one of the words of the generated advertisement request.

17. Apparatus comprising:
   a) an input for accepting search query information including a word;
   b) at least one processor; and
   c) at least one storage device storing machine executable instructions which, when executed by the at least one processor, perform a method including,
      1) determining one or more words related to the word included in the accepted search query,
      2) generating, automatically using a stored mapping comprising a parameter derived from past performance of ads served, an advertisement request including
         i) the word included in the accepted search query, and
         ii) the one or more words determined to be related to the word included in the accepted search query,
      3) retrieving advertisements using the advertisement request,
      4) determining a score for each of the retrieved advertisements using at least one of advertisement performance information and advertisement price information,
      5) adjusting the scores of any advertisements retrieved solely on the basis of the one or more words determined to be related to the word included in the accepted search query relative to any advertisements retrieved on the basis of the word included in the accepted search query to generate adjusted scores, and
      6) serving at least some of the advertisements to a client device for rendering to a user, wherein the serving is controlled, at least in part, using the adjusted scores.

18. The apparatus of claim 17 wherein the act of adjusting uses the parameter derived from past performance of ads, the method further including
   7) updating the parameter using at least one of advertisement selection information or advertisement conversion information.

19. The apparatus of claim 17 wherein the act of adjusting uses the parameter derived from past performance of ads, the method further including
   7) updating the parameter using a function that causes the updated parameter to converge to observed user behavior relevant to performance divided by predicted user behavior relevant to performance.

20. The apparatus of claim 17 wherein the act of retrieving advertisements using the advertisement request retrieves advertisements relevant to any one of the words of the generated advertisement request.

* * * * *